(Model.)
S. C. PETTEGREW.
NUT LOCK.
No. 478,019. Patented June 28, 1892.
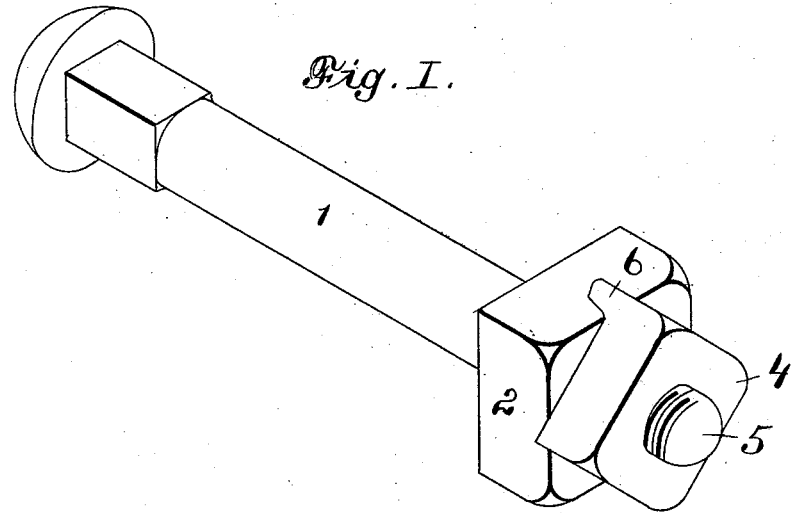
Fig. I.
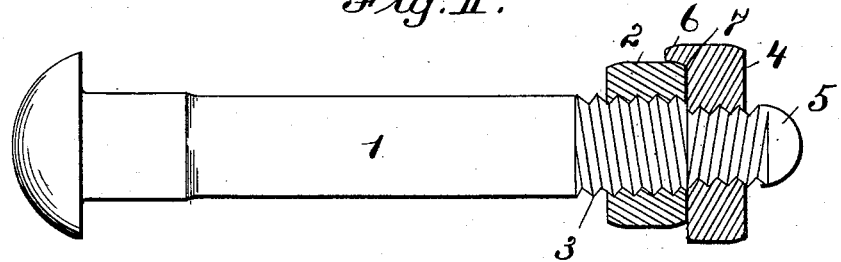
Fig. II.
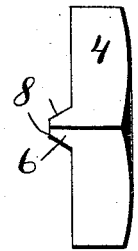
Fig. III
Witnesses:
F. G. Fischer
George E. Cruel
Inventor:
S. C. Pettegrew
By Knight Bros.
Attys.

UNITED STATES PATENT OFFICE.

SWITHEN C. PETTEGREW, OF BAYARD, KANSAS, ASSIGNOR OF ONE-HALF TO DRURY E. VANDEGRIFT, OF SAME PLACE.

NUT-LOCK.

SPECIFICATION forming part of Letters Patent No. 478,019, dated June 28, 1892.

Application filed June 1, 1891. Serial No. 394,781. (Model.)

*To all whom it may concern:*

Be it known that I, SWITHEN C. PETTEGREW, of Bayard, in the county of Allen and State of Kansas, have invented certain new and useful Improvements in Nut-Locks, of which the following is a full, clear, and exact description, reference being had to the accompanying drawings, which form a part of this specification.

My invention relates to certain new and useful improvements in nut-locks; and it consists in certain features of novelty hereinafter described, and pointed out in the claims.

Figure I is a perspective of my improved nut-lock. Fig. II is an elevation showing the nuts in section. Fig. III is a side elevation of the outer nut.

Referring to the drawings, 1 represents the bolt to which the nuts are secured. 2 represents the inner nut, secured to the bolt 1 on a right-handed threaded portion 3, the said nut being rounded or beveled off, as shown in Fig. 2.

4 represents the outer nut, preferably formed of spring-steel, said nut being secured to the bolt 1 on an extension 5 of said bolt, said extension being of less diameter than the portion to which the inner nut is secured and having a left-handed thread, or a thread running in an opposite direction from the thread to which the inner nut is secured.

I have described the inner thread as being right-handed and the outer thread as left-handed, but do not confine myself to this specific construction, as, if desired, the inner thread may be a left-handed thread and the outer thread a right-handed one.

On the outer nut 4 is a lateral fixed extension 6, which when said nut has been screwed into place extends over the inner nut 2, said extension 6 having its under surface beveled, as shown at 7, and having its sides beveled, as shown at 8.

In operation after the bolt has been placed in position the nut 2 is screwed thereon, said nut passing over the extension 5, as it is of smaller diameter than the thread of said nut, after which the nut 4 is screwed onto the extension 5. When the same is screwed up tight, the projection 6 will extend partially over the nut 2, so that should the nut 2 attempt to loosen or become unscrewed it will be impossible for it to do so, as in rotating backward it will come in contact with the projection 6 on the outer nut 4 and cause the same to move forward on its individual thread, thus securely locking the two nuts. The projection 6 is beveled, as shown at 7 8, so that as the nut 2 attempts to unscrew, and in doing so forces the nut 4 toward itself, it will permit the nut 4 to approach the nut 2.

I claim as my invention—

1. The combination of the bolt 1, a portion 3 of which is threaded in one direction, as shown, an inner nut placed on said portion, an outer portion 5 of less diameter than the inner portion and having its thread running in the opposite direction from the inner portion, a permanent outer nut placed thereon, and a lateral fixed extension 6, formed with and projecting permanently from said outer nut and adapted to project over the inner nut when the outer nut has been screwed into place, substantially as described, and for the purpose set forth.

2. The combination of the bolt 1, having a nut secured to a portion of the same, said portion having a thread running in one direction, an outer portion 5, having a thread running in the opposite direction and being of less diameter than the inner portion, and nuts secured to said portions, said outer nut having a lateral fixed extension 6, the said extension having an under beveled face 7 and side beveled faces 8, substantially as and for the purpose set forth.

3. The combination of the bolt 1, having a portion threaded in one direction, an outer portion of less diameter than the inner portion, having its thread running in the opposite direction, and nuts screwed onto the threaded portions, the inner nut being rounded or beveled off and the outer nut having an extension 6, the said extension having an under beveled face 7 and side beveled faces 8, substantially as and for the purpose set forth.

SWITHEN C. PETTEGREW.

Witnesses:
JAS. E. KNIGHT,
F. E. MULLETT.